United States Patent Office 2,701,965
Patented Feb. 15, 1955

2,701,965

MAINTENANCE OF CONDUCTIVITY IN ELECTRICAL DISTRIBUTION SYSTEMS

Ralph Sherman, Warren, Ohio; Alex Sherman and Arnold Sherman, executors of said Ralph Sherman, deceased Application December 31, 1946, Serial No. 719,367

14 Claims. (Cl. 73—359)

This invention relates to the testing and eventually improving of the conditions of conductivity in electric systems. It is concerned more particularly with the protection of low voltage circuits against the consequences of contact deterioration or interruption.

It is an object of my invention to provide means whereby any appreciable deterioration of contact conductivity in a low voltage circuit is not only detected and signalled, but also made up for by instantaneous restoration of the conductivity of the contact, and this in a particularly simple and effective manner.

The provision of means for improving or restoring the conductivity of contacts is especially important in connection with measuring systems which are known to operate with very low currents and voltages. Such systems contain a number of contacts which are subject to deterioration, for instance through oxidation, through deposition of dirt and dust and through other causes such as mechanical concussions. It is well known that in circuits operating under 200–300 volts, but also in high tension systems any oxidation or the mechanical loosening of the parts of a contact causes the resistance to rise very considerably and sometimes even the passage of current to be practically interrupted. In low voltage systems such as measuring circuits the deterioration of contact conductivity by oxidation or from other causes is still more dangerous since the protection offered by the measuring instruments may be eliminated thereby altogether.

In electric arc furnaces the normal voltage existing between the electrode holders and the electrodes amounts to a fraction of a volt. Higher resistance arising in contacts of measuring systems connected with the electrodes creates a greater voltage drop in the measuring circuit and the values read at the instruments may therefore appear lower than they really are. It may even happen that while the resistance at a contact between the electrode holders and the electrode deteriorates gradually, the instruments indicate a gradual lowering of the resistance which might cause the attendant watching the instruments to overlook the danger.

When measuring the current intensity in D. C. systems by means of a moving coil instrument with shunt, it may happen that an unduly low amperage is indicated by a rise in the measuring contact resistance. This leads to a misjudging of the real load on the machine and may create a dangerous situation. Also when measuring temperature with the aid of thermocouples, only some thousandths of a volt become active and a deterioration of contacts in the measuring system may cause production losses. If the deterioration proceeds very fast, the measuring instrument may cease functioning altogether.

All these disturbances are prevented and deteriorated contacts are improved or restored according to this invention, without requiring any searching for defects and any manual cleaning of a contact, by intermittently cutting in and connecting to the contact a source of current of a voltage higher than the highest voltage drop occurring at this contact. At a certain voltage impressed on it by current source the insulating layer or the like which has formed at the contact, will be punctured and a conductivity is reestablished in the contact which is sufficient for the passage of a low measuring current. The very low amperage of the source of current leads to the very slight local puncturing which suffices for restoring the minute contacts.

While according to this invention, the source of current furnishing the puncturing voltage is connected only from time to time with the system to be controlled by it, I have described, in a co-pending application filed of even date herewith, Serial No. 719,368, now Patent No. 2,528,558 dated November 7, 1950, a method and means for attaining the same results with the restoring currents permanently fed to the system to be controlled.

Restoration of contact as effected in the manner here described occurs not only between two metallic parts, but also between a metal and carbon, between two conductors containing carbon, and under certain conditions even between two carbon bodies.

The contact is restored mainly in those cases where an appreciable deterioration has occurred which materially affects the measuring results. It should be noted in that connection that the invention is designed in the first place for use in connection with every day measurements, as contrasted with precision measurements. On the other hand, restoration of contact conductivity can take place only in those cases where the deterioration has not proceeded too far, i. e. where the conductive contact is only hindered by oxidation or by deposition of dust or dirt or the like. Wherever the contact is interrupted altogether and a substantial air gap has formed, no restoration can be expected to take place. However, in the great majority of cases such deterioration is brought about only by the formation of a thin insulating layer and in all these cases restoration is possible.

If the voltage furnished by the conductivity restoring device according to this invention is sufficiently high to attain an increased current flow across the deteriorated contact, an improvement may be obtained already with a fraction, say one-tenth of an ampere, passing through. Of course, with an amperage as low as that this improvement may not always be completed. On the other hand, if the current intensity is unduly high in proportion to the size of the contact, a partial or even complete burning away of the contact may result. In most cases, where measuring contacts are concerned, a current of about 1 to 3 amperes will be found useful. If the voltage is too low, no puncturing of the oxide or dirt layer may be effected. The maximum voltage required in the conductivity-maintaining arrangement for measuring systems of very low voltages will mostly be 110 to 220 volts. If used in connection with high voltage installations a much higher voltage may be required to puncture the oil or resin layers. A higher puncturing voltage may also be needed in the case of a very great deterioration of the contacts. Adjustment to the correct voltage and amperage may be effected, in the case of direct current, by changing the series resistance, by employing a voltage divider, or by other means. With an alternating current source, adjustment of voltage may be effected by changing the magnetic flux in the transformer or by providing an adjustable choke coil, or the like.

Since the amperage and voltage used in the conductivity-maintaining device play a vital role, they must be controlled carefully for the best possible restoring effect. This can be done by means of the normal indicating instruments (ammeters, voltmeters, and the like), which may also indicate the condition of the contact under test. The higher the voltage required for a puncture, the poorer were conditions at the contact.

Restoration of a contact as a rule occurs all of a sudden the moment the non-conductive layer is punctured, and the amperage of the restorer rises substantially.

Preferably the restoring device is not applied only after a deterioration of the contacts has been ascertained. The current impulses or additional current loads should be sent through at regular intervals and should be sent through the more frequently the greater the danger of failure at the contacts. Such consecutively repeated application of current impulses assures the provision of good conductivity at the contacts and is often highly desirable, especially in aggravated cases where a single impulse is not wholly successful in bringing about contact conductivity.

There exist various methods of measuring extraordinarily low electrical values. These methods are, however, too costly and extremely low voltages and currents create great difficulties. I avoid these difficulties by applying currents which greatly, often a hundred times or more, exceed the current normally flowing through the contact to be protected. The use of materially higher currents does not endanger the installation, provided the main measuring instrument is not affected, since approximately only 1 to 3 amp. will be applied. In measuring systems the conductors are always strong enough to allow the passage of such currents.

In using the invention for supervising and restoring the conductivity of contacts, I do not intend to obtain precise data, since between the measuring or indicating instruments of the conductivity-maintaining device and the contacts which are being supervised, there are inserted wires and other conductors, sometimes of considerable length and, therefore, the values read at the instruments include the resistance of these wires which may form a great part of the total resistance measured. As long as the change of condition of the contact is so insignificant as not to materially affect the main measurements, this change is not of interest. But if the contact deteriorates to the extent of adversely affecting the measurements in the system to be protected, or if the contact cannot be restored satisfactorily, the instruments of the conductivity-maintaining device will show it. Thus the same device, if used in connection with measuring and other systems operating under very low tension, first shows the actual condition of the contacts in the system, it then acts towards restoring deteriorated contacts, and after this again indicates their actual state.

In order to also find out whether the main measuring instrument in a measuring system is in good condition, the conductivity-maintaining device may be combined with a voltage divider or some other voltage regulator, which allows applying a certain voltage to the instrument without endangering it.

Whenever it is desired to keep low the first cost of the protective device, regulating devices may be dispensed with by employing a source of current with a limited voltage and amperage. The measuring instruments which form part of the conductivity-maintaining device may be replaced by incandescent lamps, which allow the passage of an amperage sufficient for restoring a contact and are connected in series by means of a switch to a suitable current source, for instance the light network.

The bulb may even be replaced by a series resistance.

In order to be able to send the current from the current source of the conductivity-maintaining device through predetermined sections of a measuring system and thus to prevent the main measuring instrument from being endangered, I employ a switch inserted in the system which enables me to interrupt the circuit of the measuring system and to subject any number of sections of the system to be protected simultaneously to the action of the conductivity-maintaining device. I am thereby enabled to feed to the selected section of the system any desired voltage and current from the current source serving for restoring the contact.

In the drawings affixed to this specification and forming part thereof, some embodiments of my invention are illustrated in diagrams by way of example.

In the drawings—

Figure 1:
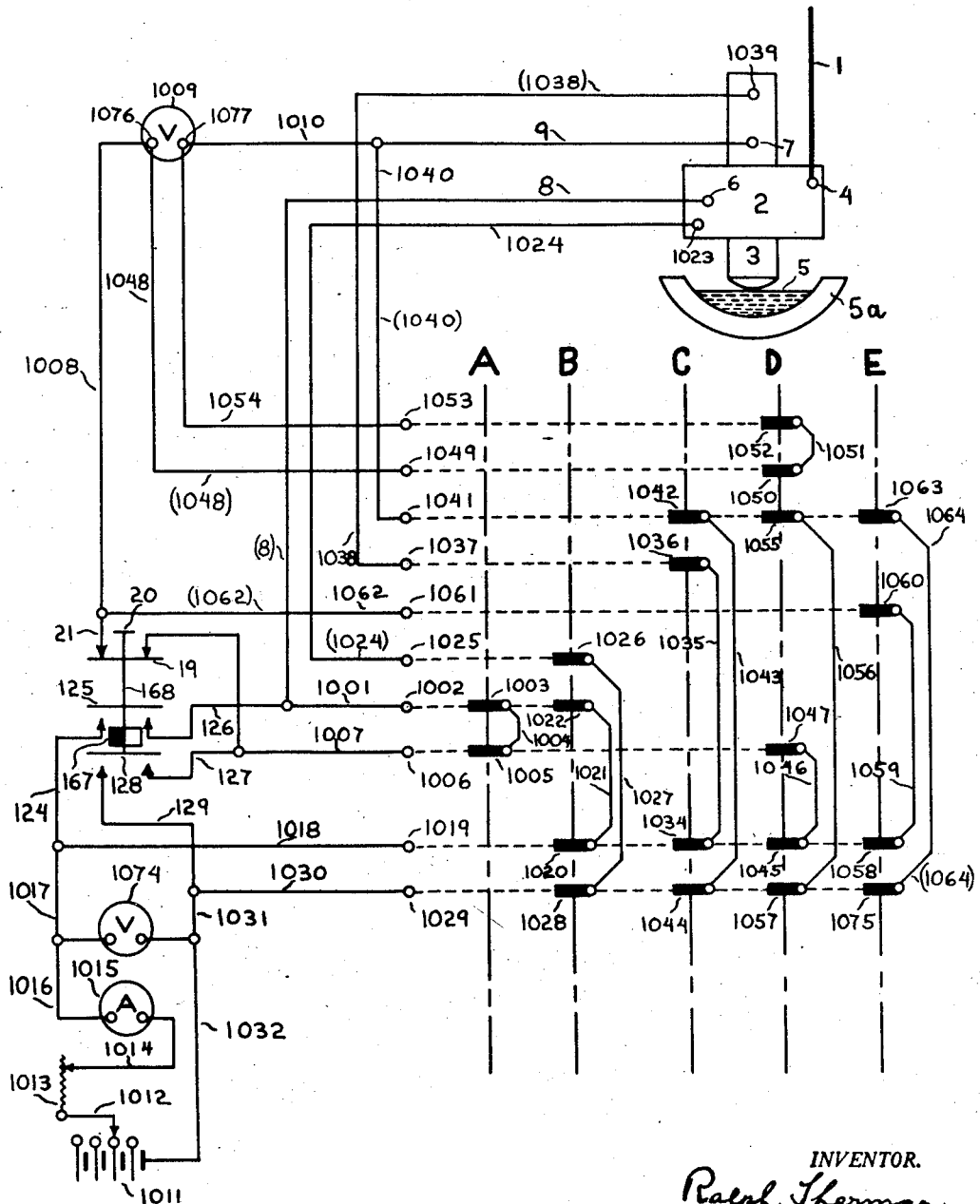
Fig. 1 shows a circuit according to this invention including means for supervising the contact between the electrode and the electrode holder of an electric melting furnace.

Referring to the drawings, and first to Fig. 1, in order to show in the clearest possible way, the construction and mode of operation of the conductivity-maintaining device, the measuring system is represented only by a voltmeter. It should, however, be understood that this voltmeter here stands for all kinds of measuring or indicating devices known in the art and adapted for application in combination with the conductivity-maintaining device.

1 is the feed conductor for heavy current connected at 4 to the electrode holder 2. 3 is the electrode. 5 a body of molten metal in the furnace or crucible 5ᵃ. 1009 is a measuring instrument (voltmeter) serving to supervise and indicate the voltage drop between the electrode holder and the electrode.

The main parts of the restorer are the regulatable direct current source (battery) 1011, with the cell switch 1012, regulating resistance 1013, amperemeter 1015, voltmeter 1074, and a special auxiliary switch 20 whose function will be explained further below.

Between the furnace and the protective device is arranged for connection the rotatable controller of a known kind having ten contact fingers 1053, 1049, 1041, 1037, 1061, 1025, 1002, 1006, 1019 and 1029, arranged in a vertical row, and twenty contact segments arranged in five vertical groups distributed over the circumference of the controller cylinder, viz: Group A (with segments 1003 and 1005), group B (segments 1026, 1022, 1020, 1028), group C (segments 1042, 1036, 1034, 1044), group D (segments 1052, 1050, 1055, 1047, 1045, 1057), and group E (segments 1063, 1060, 1058, 1075). In group A the two segments are connected by wire 1004. In group B segments 1026 and 1028 are connected by wire 1027, segments 1022 and 1020 by wire 1021. In group C segments 1042 and 1044 are connected by wire 1043, segments 1036 and 1034 by wire 1035. In group D segments 1052 and 1050 are connected by wire 1051, segments 1055 and 1057 by wire 1056, segments 1047 and 1045 by wire 1046. In group E segments 1063 and 1075 are connected by wire 1064, segments 1060 and 1058 by wire 1059.

If the controller is in its normal (rest) position where the segments of group A contact the fingers 1002, 1006, the voltmeter 1009 of the main measuring circuit is connected as follows: From the measuring wire 8, connected in point 6 to the electrode holder 2, current flows through wire 1001, finger 1002, segment 1003, wire 1004, segment 1005, finger 1006, wires 1007 and 18, connecting bar 19 of the auxiliary switch 20, wires 21 and 1008, voltmeter 1009, wires 1010 and 9 to the measuring contact 7 at the electrode 3. This closes the measuring circuit, in which the voltmeter 1009 indicates the drop of potential between the electrode holder 2 and the electrode 3.

The contacts 6 and 7 of the electrode holder and the electrode, respectively, are exposed to various obnoxious influences exerted by the furnace and therefore may be subject to very strong deterioration which might render any useful measuring impossible after a short period of time.

The conductivity-maintaining device according to this invention solves the problem in a very simple manner. Assuming, for instance, the controller to have been turned into position B, where the contact fingers 1002 and 1006 are not connected any more, the circuit leading to the voltmeter 1009 is interrupted, the contact-maintaining device is cut in. Current now flows from the battery 1011 through switch 1012, resistance 1013, wire 1014, ammeter 1015 and wires 1016, 1017, 1018, to finger 1019, which is thus directly connected with the battery. From here current flows through segment 1020, wire 1021, segment 1022, finger 1002, wires 1001 and 8, contact 6 and the metallic body of the electrode holder 2 to the auxiliary contact 1023 on this holder, wire 1024, finger 1025, segment 1026, wire 1027, segment 1028, finger 1029, and through wires 1030, 1031 and 1032, back to battery 1011.

The ammeter 1015 indicates the number of amperes flowing through from the conductivity-maintaining device, while the voltmeter 1074 indicates the potential.

If contact 6 had suffered a deterioration, the insulating layer formed on it will be punctured and good conductivity will be restored. The voltage at which the puncturing took place can be read at the voltmeter 1074.

This puncturing on the required voltage being reached, occurs as a rule almost instantaneously. The amperage indicated by the ammeter 1015 then rises all of a sudden at this moment and, according to the kind of contact, must reach a certain magnitude in order that restoration of conductivity be satisfactory. At the same moment the voltage indicated by the voltmeter 1074 drops correspondingly. If the instrument readings do not change in this manner to indicate that good contact conductivity has resulted, consecutively repeated application of the current impulses is desirable as previously explained.

This is easily accomplished by moving the controlling switch back and forth several times between positions A and B.

It is possible to ascertain, by way of experimentation, the amperage required to normally flow from the restorer at a predetermined voltage, if the measuring contact 6 is in good condition. Consequently it is possible to ascertain, as soon as the conductivity-maintaining device is cut in, whether a deterioration of the measuring contact 6 has taken place.

As described at the beginning, in order to render the test easier, I prefer to use an amperage which is a multiple, for instance a hundredfold or more, of the amperage normally passing through the measuring system. If a sufficiently sensitive regulation is possible, one can start with a low voltage thereby enabling the puncturing voltage to be readily read at the instrument.

If now the voltage required to effect puncturing at different intervals are compared, this will furnish information regarding whether the deterioration of contact occurs in a normal manner or whether a progressive deterioration is under way. If it has been found that after a certain period of time an inadmissible deterioration of contact has occurred because an unduly high voltage had to be applied to restore the contact 6, this contact should be inspected and improved at times where the furnace is cut out for some other reason.

The auxiliary contact 1023 being located on the same conductive member (electrode holder) as the measuring contact 6, and close to it, there exists practically no difference of potential between the two. Therefore, although the conductivity-maintaining device is cut in while the main circuit is traversed by the system current, the ammeter and voltmeter of the device are not influenced by this current. This circumstance enables me to supervise closely the actual conditions of operation of the measuring contact and the amperage and voltage at which the insulating layer is punctured.

When the controller is rotated into the position where the segment group C becomes operative, the measuring contact 7 is tested and/or restored in exactly the same manner as described with reference to contact 6. In this case current flows from contact finger 1019 to segment 1034, wire 1035, segment 1036, finger 1037, wire 1038, auxiliary contact 1039, electrode 3, measuring contact 7, wires 9 and 1040, finger 1041, segment 1042, wire 1043, segment 1044 and finger 1029. From here, as described with reference to position B, the current flows back to the direct current source 1011.

In considering the effect of the action of the restoring device and more particularly in reading the instruments 1074 and 1015, it is assumed that in most cases a deterioration occurred only at contact 6 and/or contact 7, since these contacts are subjected, more than any others, to the influence of heat, gases or the like. Obviously, however, any other imperfect contacts present in that section of the system will be affected in a similar manner by the action of the conductivity-maintaining device, both as to the restoring effect and to the indication of the operative condition of the whole section.

If it should be desirable to be able to find out exactly which contact had failed, or to what extent it had deteriorated, a sufficient number of additional controller positions would have to be provided to enable, for instance, contact 6 to be tested also together with contacts other than 1023. A comparison of values obtained, and more especially the values that show that the tested pair of contacts can be subjected to a considerable higher voltage without being punctured, would show which contact was the one that had deteriorated.

In the position D of the controller the contacts in the remaining part of the measuring circuit including the connection contacts at the terminals 1076 and 1077 of the instrument 1009 are tested and/or restored. However, in this case provision must be made for protecting the measuring instrument 1009 against injury. To this end the instrument is simply short-circuited at its terminals. The current from the restorer then flows as follows: from controller finger 1019 to segment 1045, wire 1046, segment 1047, finger 1006, wire 1007, wire 18, connecting bar 19 of the auxiliary switch 20, wires 21, 1008 and 1048, finger 1049, segment 1050, wire 1051, segment 1052, finger 1053, wires 1054, 1010, 1040, finger 1041, segment 1055, wire 1056, segment 1057, finger 1029 and from here back to battery 1011.

As resorts from this description, the voltmeter 1009 is short-circuited by means of the wires 1048 and 1054 provided expressly for that purpose, with the aid of the corresponding segments 1050 and 1052.

Therefore also in the position D of the controller the full current required for testing and/or restoring can be sent through. In this position also the contacts and wires 18 and 21, between the connecting bar 19 and the contact points, of the auxiliary switch 20 are tested and/or restored.

Position (or segment group) E serves for testing the instrument 1009 itself for correct indication. In this position the current flows from controller finger 1019 to segment 1058, wire 1059, segment 1060, finger 1061, wire 1062, wire 1008, voltmeter 1009, wires 1010 and 1040, finger 1041, segment 1063, wire 1064, segment 1075, finger 1029 and from here back to the battery.

I prefer to use a voltmeter (1074) with an additional, particularly precise range of measurement, which might be cut in only by way of a push button switch and would be used only where necessary, more particularly after the measuring contact has been restored, when the voltage indicated by the regular range of the voltmeter 1074 is very low.

As shown at the beginning, all contacts of the measuring circuit can be tested and/or restored by means of the protective device, and there remain over only the additional contacts at 1002, 1003, 1006, 1005 through which flows the measuring current in the normal (A) position of the controller. Normally these contacts can be kept in good conductive condition by frequent actuation of the controller. However, in particularly important installations there may arise a need for testing also these contacts during operation. This is provided for by the auxiliary switch 20 whose bar 19 normally connects the wires 18 and 21 for the passage of the measuring current. Two more connecting bars form part of the switch, bar 125 which is electrically connected to bar 19, and bar 128 which is electrically insulated from the switch by the insulating piece 167.

If, in the normal (A) position of the controller, the switch 20 is moved down, the contacts at bar 19 are opened and the measuring circuit of voltmeter 1009 is interrupted. At the same time the bar 125 connects the wires 124 and 126, while bar 128 connects wires 127 and 129. Current now flows from one terminal of the battery 1011 through cell switch 1012, resistance 1013, wire 1014, ammeter 1015, wires 1016, 1017 and 124, bar 125, wires 126 and 1001, contact finger 1002, segment 1003, wire 1004, segment 1005, finger 1006, wires 1007 and 127, bar 128, wires 129, 1031, 1032 to the other terminal of the battery. The protective circuit is now closed and the contacts 1002 with 1003 and 1005 with 1006 can now be tested and/or restored in the same manner as described for instance with reference to contact 6.

The other new contacts of the measuring circuit formed between the parts 18, 19, 21 can be tested and/or restored through introduction of the auxiliary switch 20 with the controller in D position.

Instead of battery 1011, any other current source and also alternating current could be used without regard to the character of the working current. The regulation of the current intensity and voltage can also be effected in any desired manner. For instance, when testing the measuring instrument 1009, the use of a voltage divider will be advisable.

When testing this instrument, I may also use a separate contact finger in the controller, which prevents the potential acting on the instrument from exceeding a predetermined maximum value. Limitation of this potential may be obtained for instance by inserting a particularly high resistance in series with the separate finger, or by providing that the divider, if any, does not transmit any undue potential.

The precision range of measurement, mentioned above, of the instrument 1074 might be connected to another additional contact finger which connects this precision range with the testing device only in this particular position. If it is desired to test also the main measuring instrument 1009, care should be taken to use a current source for the conductivity-maintaining device which is capable of operating this instrument. If, for instance, it is a D'Arsonval instrument, the protective device in E position should be able to feed to it direct current, if necessary, with the air of a rectifier, if an alternating current source is used in the protective device.

For precision measurement as is well known, direct current is better adapted.

If conductivity maintenance of greater simplicity is desired, a nonregulatable source of current with a predetermined maximum potential and current intensity may be used. Also in this case the deflections of the instruments 1015 and 1074 will show the condition of the contacts to be tested, and their eventual restoration.

In certain cases a direct testing of the measuring instrument 1009 may be dispensed with. In that case the contact group E need not be provided, and the change in the deflection of the main instrument 1009 by the same load of the furnace before and after insertion of the conductivity-maintaining device will then show whether any restoration has taken place.

The voltmeter and ammeter of the conductivity-maintaining device might be replaced by an incandescent lamp, which if connected in series with the source of current, may serve directly as a limitation resistance and also as a crude kind of indicating device for the passage of current and for its amperage. The lamp should, of course, be so chosen that the greatest possible amperage passing through it will be adapted to restore the deteriorated contact.

Another lamp, replacing the voltmeter 1074, may crudely indicate the potential.

On the other hand, instead of using lamps, a mere series resistance in the protective device could be used which then would consist of a source of current limited as to amperage and potential. In that case the fact of whether restoration has taken place would be ascertained only indirectly by watching the measuring instrument 1009 and comparing its deflections before and after cutting in the conductivity-maintaining device, taking into consideration the actual network load.

In these simplified devices the auxiliary switch 20 may be dispensed with.

The controller may have any number of control positions with wires connecting them with any desired section of the measuring circuit. The conductivity-maintaining device may either cover the entire circuit or only certain particularly important or sensitive sections.

Figure 2:
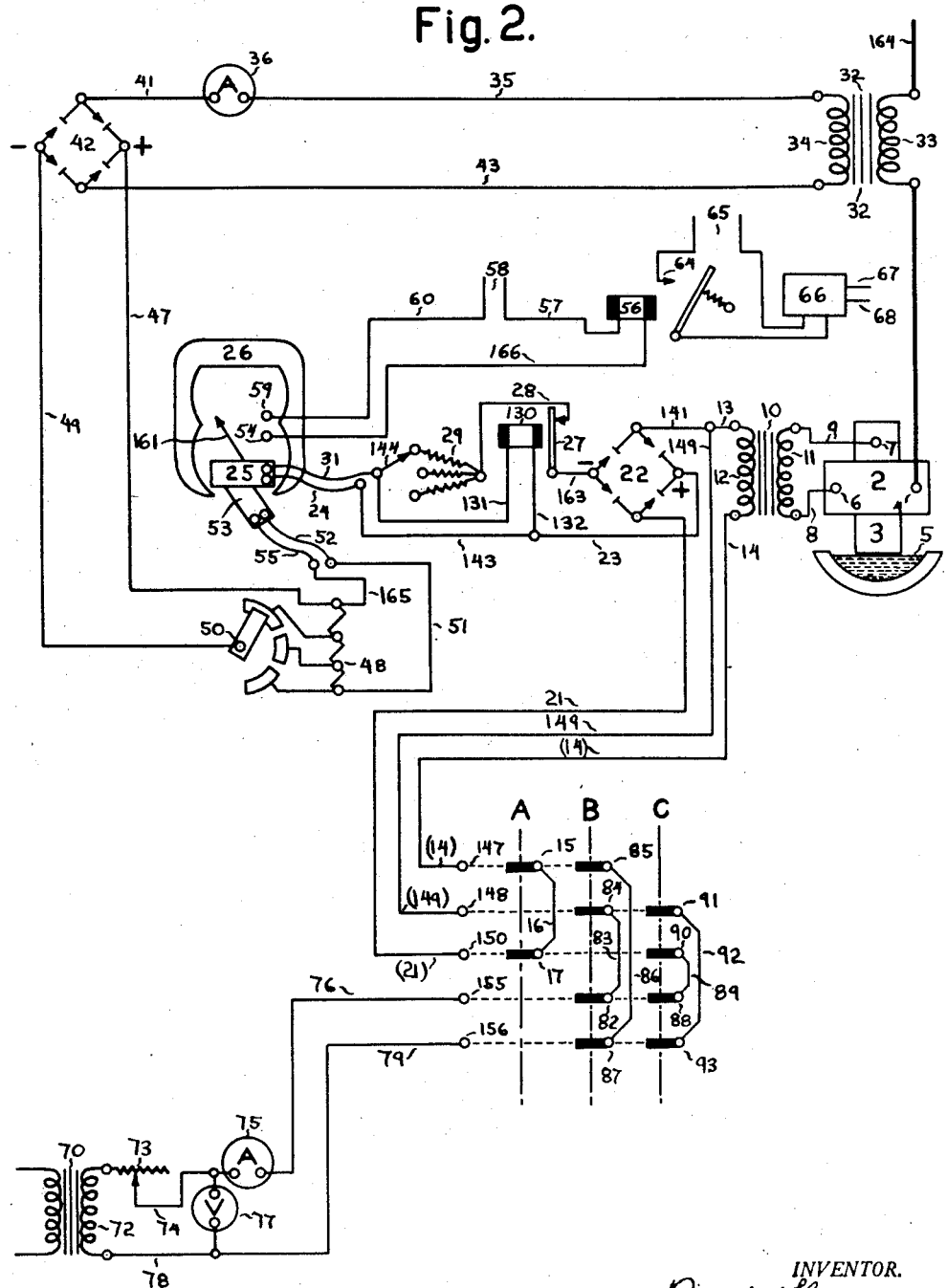
Fig. 2 shows a similar arrangement for alternating current, which lacks the auxiliary contacts shown in Fig. 1.

Fig. 2 illustrates the use of the conductivity-maintaining device, however without any auxiliary contacts, in a measuring system serving for indicating and/or controlling changes in the conductivity between an electrode and its holder in a large current consuming unit (electric furnace). In this figure, A, B, C again designate different positions of a controller inserted in the protective device. The contact fingers are shown as being constituted by open wires with coiled ends arranged in a vertical row opposite the contact segments of the controller.

The measuring system is represented here by a diagram of connection of a circuit feeding alternating current of high current intensity through a lead 164 to the electrode holder 2 of the electrode 3 of an electric melting furnace and through it to the body 5 of molten metal. The conductivity of the contact between the electrode and the holder is supervised and controlled continuously while the furnace is in operation, by providing a measuring instrument which may be permanently connected in the circuit and at any time indicates to the operator whether the contact is good or requires improving. To this end two wires 8 and 9, connected to the holder and the electrode at 6 and 7, respectively, lead to the primary winding 11 of the voltage transformer 10. The potential of the secondary transformer winding 12 is transmitted by wires 13 and 141 to the bridge rectifier 22, while on the other side a wire 14 leads to the contact piece 147 of a small controller whose normal position is marked by the letter A, where the current from contact piece 147 passes through the contact segment 15, connecting wire 16, segment 17, contact piece 150 and wire 21 to the other side of the rectifier 22 and from one side of the rectifier through wires 23, 143, 24 to the voltage coil 25 of the measuring instrument (cross-coil ohmmeter) 26, from the other side through wire 163, contact 27 and wire 28 to the series resistance 29, allowing adjustment to different measuring ranges, and from this resistance through the brush 144 and wire 31 to the second end of the voltage coil 25 of the measuring instrument.

The electrode 3 is supplied with current through wire 164, the primary winding 33 of the current transformer 32, whose secondary winding 34 is connected on one side to the rectifier 42 by way of wire 35, ammeter 36 and wire 41, while the other side is connected to the rectifier by the wire 43. From this rectifier the wire 47 leads to one end of the adjustable shunt 48, while a wire 49 connects the rectifier to the brush 50 of this shunt, whose ends are connected on one side through wires 165, 55 to one end of the current coil 53 of the cross-coil instrument, on the other side through wires 51, 52 to the other end of this coil.

Since the cross-coil ohmmeter directly indicates the ratio of potential and current, the resistance can be read directly on its scales. Adjustable series resistance 29 and adjustable shunt 48 are provided for the purpose of adapting the instrument to various conditions in different installations.

It is advisable to ascertain from time to time whether the contacts in the testing circuit are perfect. To this end a rotatable controller is provided with a separate alternating current source feeding a low tension transformer 70 with a resistance 73 regulating the current output of the secondary winding 72 which is connected by the wire 74, ammeter 75 and wire 76 to the contact piece 155, while on the other side the wires 78 and 79 lead to the contact piece 156. Between the wires 74 and 78 a voltmeter 77 is connected for measuring the voltage output.

When the controller is turned into the first testing position B, current will flow from one terminal of the low tension transformer 70 through contact piece 155, segment 82, wire 83, segment 84, contact piece 148, wire 149 and wire 13 to one end of the winding 12 of the voltage transformer 10. The other end of winding 12 is connected to the source of current by means of the contact piece 156, segment 87, wire 86, segment 85, contact piece 147 and wire 14. Hereby this winding 12 is excited and a voltage is induced in the other winding 11, which, if all the contacts are in good order, is short circuited through wire 9, contact 7 of the electrode 3, wire 8 and the contact 6 of the electrode holder 2. The deflection of the pointer of ammeter 75 at a predetermined deflection of the voltmeter 77 then allows to readily ascertain whether the contacts 7 and 6 at the electrode and its holder are in order. If they should be deteriorated, a materially lower current will pass through. In every installation the empirically determined values are ascertained by tests. If the deflection of the ammeter is found to be too low, the tension at the regulating resistance 73 is increased until the instruments show that good contact is reestablished.

By setting the small controller to the position C, the other side of the circuit of the voltage coil of the cross coil instrument 26 is then tested. To this end one pole of the voltage source 72 is connected with one side of the rectifier 22 by way of contact piece 155, segment 88, wire 89, segment 90, contact piece 150 and wire 21. The other pole is connected with the other side of the rectifier 22 by way of the contact piece 156, segment 93, wire 92, segment 91, contact piece 148, wire 149 and wire 141.

By applying a predetermined voltage and varying it, any deflection of the pointer 161 of the cross-coil instrument 26 will be noticed, while the current coil 53 is fed by the working current through the voltage transformer 32.

As shown in the drawing, the conductivity-restoring devices is being thrown in, while the primary winding 11 of the voltage transformer 10 is already influenced by the drop of potential which is caused by the working current and is measured between the contacts 6 and 7. Thus the ammeter 75 and voltmeter 77 are already subjected to the influence of two different alternating current values, the one being the current and voltage from the current source of the conductivity-maintaining device, the other current and voltage of the secondary winding 12 as induced by the voltage drop between the measuring contacts 6 and 7. It is nevertheless possible to continue watching the measuring instruments forming part of the conductivity-maintaining device for the following reason: The voltage drop between these contacts will as a rule be extremely small, mostly below 1 volt. Similarly the amperage generated by this low voltage in the secondary winding will be extremely small. From the other side, i. e., from the protective device, a so much higher voltage, for instance 30 or 50 volts, can be applied from the beginning that also the effect created by the current from the conductivity-maintaining device so greatly exceeds the influence of the small measuring current flowing from the winding 12 that the measuring instruments 75 and 77 are practically not influenced by this small current and voltage.

The arrangement shown in Fig. 2 comprises a transformer connected between the working network and the protective device. This is the voltage transformer 10 which is used in measuring the voltage drop between the electrode and its holder. This arrangement offers the advantage that, if in similar combinations the voltage between the measuring contacts 6 and 7 amounts only to a few volts, no separate auxiliary contacts are required and that the two measuring contacts are acted upon simultaneously by the restorer.

The arrangement of a transformer between this device and the working circuit is important, because one is thereby enabled to exert the effect produced by the conductivity-maintaining device on the primary side, in the case here described, in the primary measuring circuit directly connected to the working network, and this without any direct electrical connection with the primary side. Assuming, for instance, that instead of a plant operating with 200–300 volts, a high voltage installation were to be protected, this device might also be made to act on the high voltage side without any direct electric connection being provided with that side. In the arrangement shown in Fig. 2 the potential of 20–50 volts of the protective device might, for instance, be applied to the winding 12 and this device would then act on the measuring contacts on the network side, even if the network should operate with high voltage, for instance, with 2400 or 110,000 volts. It is only necessary for the voltage transformer to be provided with insulation against the respective high voltage, and the operator will then be able to act with the conductivity-maintaining device on the high voltage side without incurring any danger.

If a higher potential exists between two connections on the high voltage side of a measuring system, it will be recommendable to provide each connection with a separate auxiliary contact as shown in Fig. 1, and to insert a transformer. The auxiliary contacts then enable one to bring the voltage difference, created by the network and counteracting the protective device, practically down almost to zero. The transformer again removes any danger of a direct contact with the high tension system when using the protective system.

Obviously here also any number of positions of the controller may be provided and the measuring circuit may be subdivided into any desired number of sections to be tested. A shortcircuiting device for the main measuring instrument 26 may be provided whereby the current from the protective device may be raised in this part of the measuring circuit so high that all contacts up to the connection at the instrument itself can be tested and/or restored.

If it is unnecessary or undesirable to provide a transformer 10, it is possible in low tension installations having a difference of potential of only a few volts between the measuring contacts 6 and 7, to subject these two contacts simultaneously to the action of the restorer by interrupting the primary circuit, for instance at 8, and connecting the restorer to 8 and 9 simultaneously.

Obviously the alternating current source shown in Fig. 2 might be replaced by a source of direct current if no voltage transformer should be available or the conductivity-maintaining device is connected between the measuring contacts and the voltage transformer.

Figure 3:
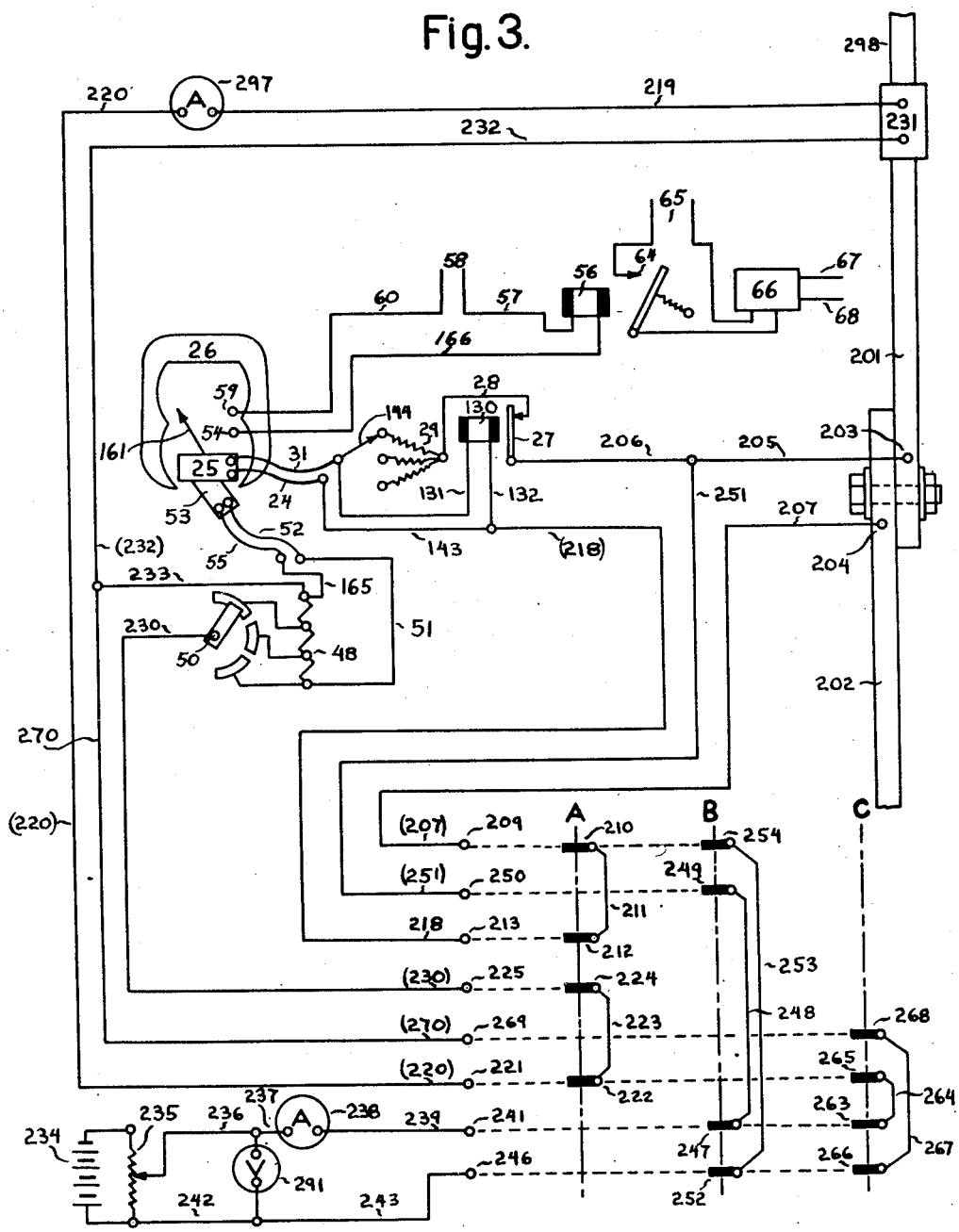
Fig. 3 illustrates the application of this invention to a direct current measuring system.

Fig. 3 illustrates the application of the principle underlying this invention to a direct current system, the testing device being again traversed by the working current. Here the contact between two bus bars 201, 202 shall be tested.

The greater part of the equipment including the wiring from the cross-coil instrument and its voltage coil up to the contact 27 is connected by way of wires 206 and 205 to the contact 203 on bus bar 201. The other side of the voltage coil is connected to the other bus bar 202 through wires 143 and 218, contact piece 213 (the controller being in the normal operating position A), segment 212, wire 211, segment 210, contact piece 209, wire 207 and contact 204.

This inner connection of the current coil 53 up to the adjusting shunt 48 is also the same as in Fig. 2. One end of the shunt 48 is connected through the wires 233, 232 to one end of the shunt 231 which is inserted in the lead 298 to bus bar 201. The brush 50 is connected through wire 230, contact piece 225, segment 224 (the controller being in the position A) wire 223, segment 222, contact piece 221, wire 220, ammeter 297 and wire 219 to the second terminal of the shunt 231.

This system functions exactly like the one illustrated in Fig. 2. Here also any excessive rise of the intermediate resistance will cause the pointer of the cross-coil instrument to be deflected so far as to close the contacts 54 and 59, whereby the signal device 66 is actuated. The protection against excess voltage is the same as in Fig. 2, and here also two positions of the controller are shown in which the contacts are tested.

This example comprises a separate source of direct current 234 with a voltage divider 235 (controller in position B). One pole is connected through wires 242, 243, contact piece 246, segment 252, wire 253, segment 254, contact piece 209 and wire 207 to the contact 204 on bus bar 202. The other pole from the separate direct current source (battery) is connected through contact piece 241, segment 247, wire 248, segment 249, contact piece 250 and wires 251, 205 to the contact 203 of the bus bar 201.

Here, as in the system shown in Fig. 2, the deflections of ammeter 238 and the voltmeter 291 of the separate source of current will show whether there exists an intimate contact in the main measuring system. Here, also, if necessary the voltage will be increased until conductivity of the contacts is restored.

In the position C the connection leading to the shunt 231 is tested. Since this is done in exactly the same manner as explained with reference to position B, there is no need for going into the details of this connection.

It appears obvious that in order to test and/or restore the contact and the several sections of the measuring circuit the source of direct current 234 might be replaced by a source of alternating current with or without corresponding regulation. Only when testing the coils of the cross-coil instrument the protective device should be organized to send direct current, for instance, by means of rectifiers.

If the measuring system is connected to a high tension direct current system, the conductivity-maintaining device, if used to test contacts in the measuring circuit, can be operated with alternating current with the aid of a transformer, for instance, similarly as explained with reference to Fig. 2.

If a higher voltage difference arises between two points of connection in the measuring system of a high tension direct current system, for each connection or section an auxiliary contact with a transformer inserted between, should be provided, also as explained with reference to Fig. 2.

If the measuring instrument shall be tested also and if it only reacts on direct current, a rectifier is arranged between the transformer and the instrument.

Figure 4:
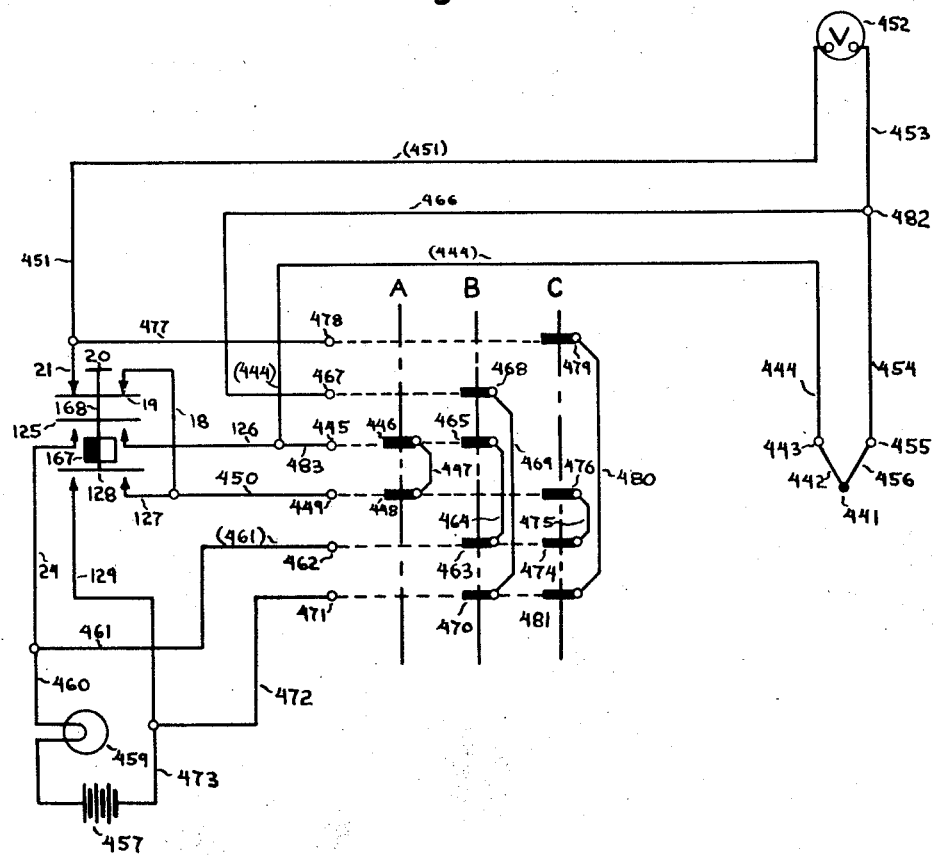
Fig. 4 shows a simpler arrangement in combination with a temperature indicator (pyrometer).

Fig. 4 illustrates the application of the conductivity-maintaining device to thermocouples which are used for many purposes and more especially in steel manufacture. They are placed for instance in the tempering furnace for precise temperature control with the aid of pyrometers connected to the thermocouples. Poor contact at the connecting wires may result in wrong temperature indications. The thermocouples may be injured when the furnace is charged with steel or the thermocouple may otherwise become deteriorated or degenerated, or the connections may be made the wrong way, with the poles reversed, or also two wires of the same metal are mounted in the thermocouple, whereby it becomes unfit for any purpose.

By applying the conductivity-maintaining device I am enabled to ascertain whether the disturbance results from a poor contact which can then mostly be restored at once, or whether the contact is interrupted altogether which would have a conductivity-maintaining device currentless, etc. In the case of a thermocouple the application of conductivity-maintaining voltage and current seems to produce a new thermo-couple junction in the event that the former junction has become deteriorated or degenerated by atmospheric conditions, heat or other causes. Moreover, even in cases where the thermo-junction was never made in the first instance, I have found that the application of the conductivity-maintaining voltage and current serves to form the thermo-junction. This is particularly true in a case of thermocouples of the twisted wire type where a new thermo-junction may be formed in accordance with the practices of my invention even if the original thermo-junction is broken off or has never been formed. The formation of a new thermo-junction or the overcoming of deterioration or degeneration of a thermo-junction is accomplished by the application of electrical energy which under various circumstances as explained on column 2 of this application may take place in one of several different ways such as first, the application of high voltage with low current; second, the application of high voltage with high current or the application of relatively low voltage with high current.

Although as illustrated in Fig. 4 in connection with thermocouples, the apparatus is arranged for the application of an optimum fixed value of voltage and current, it will be understood that the invention is not limited thereto and that provisions for adjusting the magnitude of applied voltage and current may be employed in connection with thermocouples as well as other contacts as illustrated in Figs. 1, 2 and 3. for example.

The apparatus illustrated and the method of maintaining conductivity described serve not only for maintaining thermocouples in good order but also for providing indications of the condition of the thermocouple, in addition to overcoming incorrect temperature indications which may come about as a result of chemical or physical changes in the thermo-junction metal caused by absorption of oxygen or other elements or other causes. A steady light of the lamp 459 is an indication of a good, accurately reading thermocouple, whereas an irregular flicker of the lamp 459 indicates that the junction is poor; whereas no light whatsoever indicates that the thermocouple is completely defective.

As illustrated, the selector switch ABC provides for checking or restoring conductivity in the different contacts in the thermocouple circuit including the thermo-junction itself by the application of a single current impulse or consecutively repeated impulses as previously explained. It will be understood, however, that the invention is not limited thereto and does not exclude the use of contacts on the selector switch for checking up and restoring conductivity and accuracy of various thermocouples where a plurality of thermocouples are used in connection with a single indicating device or switchboard or a single source of conductivity-maintaining current.

The drawing shows an arrangement which is adapted to cut out the current. The indicating apparatus shown is of the simplest kind, a voltmeter 452, while 441 is the thermocouple, and A—B—C are again three positions of the controller which in A position closes the circuit from the thermocouple to the voltmeter. The current then flows from 441 through wire 442, connection 443, wires 444 and 483, contact finger 445, segment 446, wire 447, segment 448, finger 449, wires 450, 18, bar 19, wires 21 and 451 and voltmeter (temperature indicator) 452, wires 543, 454, connection 455 and wire 456 of the thermocouple, and back to this device.

Position B serves for testing the condition of contact within the thermocouple and its contacts with the circuit and maintaining conductivity therein as previously explained. The current here flows from the direct current source 457 through wire 458, lamp 459, wires 460, 461, finger 462, segment 463, wire 464, segment 465, finger 445, wires 483, 444, connection 443 and wire 442, thermocouple 441, wire 456 and connection 455, wire 454, connection 466, finger 467, segment 468, wire 469, segment 470, finger 471, wires 472, 473 to the other pole of the current source 457.

The lamp 459 should be able to carry a current sufficient for restoration of a deteriorated contact. The same lamp, by the change of its light intensity, may serve as a crude indicator of the operative condition of the respective part of the measuring circuit.

The auxiliary switch 20 shown in Fig. 4 serves for testing the condition of contact and maintaining conductivity between the fingers and segments of the controller when in position A, as explained with reference to Fig. 2.

Position C serves for testing the contact between the parts 18, 19, 21 of the switch 20, and maintaining conductivity as described with reference to Fig. 1.

While the drawing shows only the testing of the thermocouple with its leads and the corresponding section of the measuring circuit, the protective device may also be used for testing other parts, such as for instance the instrument 452.

Instead of the switch arrangements shown in the drawings, there may also be provided automatically active protective switches which interrupt the measuring circuit and/or short-circuit the main measuring instrument whenever by the application of the conductivity-maintaining device current an excess voltage should be produced on this measuring instrument. Electronic valves may be used also for the protection of the main measuring instrument. All above-mentioned protective switches, or equivalent arrangements, are applied for the purpose of forcing the conductivity-maintaining impulses to go through or to pass a selected section of the electric system for producing the conductivity-maintaining effect in said section.

Obviously the conductivity restoring device here described will be useful not only for the protection of permanent contacts, but also in connection with movable contacts for low amperage circuits, for instance in signalling systems. This relates to all signalling systems operating with low tension by opening and closing switches, for instance systems comprising measuring instruments for indicating voltage, amperage, wattage, resistance and so on.

In the majority of elevator systems contacts must be closed, for instance by closing the doors before the elevator can be started. If these contacts do not function properly, the elevator may be inoperative for hours. While under ordinary circumstances it is very difficult to trace the defective contact, the protective device will cure all minor defects caused by slight oxidation or from other causes.

The conductivity-maintaining device may be used no matter whether the working current flows or not in the network.

The conductivity-maintaining device may even be useful for the restoration of permanent metallic contacts in installations carrying a higher amperage, provided the contacts to be protected are pressed against each other with a pressure sufficient to prevent any burning away.

In all these cases the conductivity-maintaining device may either be actuated manually or semi- or fully-automatically, and it may be combined with an automatic signalling system which signals every material deterioration and any interruption which cannot be cured by the restorer.

There exist various measuring methods for testing the operative conditions of mechanical connections during the manufacturing process or while a machine is at rest, all of them operating with separate current fed to an otherwise currentless machine part. The condition of the mechanical connection is indicated by a variation of the drop of potential at the point of connections. These measuring devices as heretofore organized are, however, not adapted for use in tests of the machine under working conditions. If the contacts should be deteriorated or become loose, the entire measuring system would become useless. In contrast thereto, the restoring device according to this invention offers facilities for testing the working conditions of the measuring system at any moment and for restoring its contacts, if necessary. In this manner important connections in working machines or prime movers can be supervised and protected while they are in operation.

In most cases the restoring device will be used for the restoration of contacts by applying its voltage for the puncturing of a deteriorated contact. It may, however, also be useful to use so low a restoring voltage that no puncturing can take place. This will, for instance, occur as a rule if the restorer voltage amounts to only a fraction of a volt. This can offer great advantages, for instance when testing soldered joints produced in volume production, as in the manufacture of telephones, radio receivers, etc. When testing these joints failures are frequently overlooked because the test voltage used far exceeds the voltage required to puncture imperfect soldered joints. If later on such devices are put to practical use, the defective joint may be loosened again by concussions or the like and the device will become useless. If now, according to what was explained hereabove, the conductivity-maintaining device is applied with a voltage insufficient for the puncturing of an imperfectly soldered joint, the interruptions will become plainly visible. The testing of telephones and radio receivers during manufacture should be done while the devices are not in operation. The conductivity-maintaining device may be connected to the usual testing kit.

Various changes may be made in the steps and means above described without departing from the invention or sacrificing any advantages thereof.

I claim:

1. Circuit-continuity testing device for electric circuits, at least one section of which contains a pair of normally contacting conductive parts which may be subject to formation of an insulating film which requires a potential difference for breakdown, comprising in combination a separate current source having a maximum voltage of a fraction of a volt, a current-responsive instrument testing contacts for each of said conductive parts connected to said source through said instrument, and means for varying the voltage of said source from a relatively low value less than said potential difference and gradually raising the voltage of said separate source, whereby the response of said instrument is dependent upon contact condition of said conductive parts.

2. A circuit-continuity testing device for electric circuits, at least one section of which contains a pair of normally contacting conductive parts which may be subject to formation of an insulating film which requires a potential difference for break-down, comprising in combination a separate current source having a voltage of a fraction of a volt and less than said potential difference, testing contacts for each of said conductive parts, auxiliary contacts for supplying conductivity maintaining current to said testing contacts and conductive parts and a current-responsive instrument connected to said separate source and to said testing contacts, whereby the response of said instrument is dependent upon contact condition of said conductive parts and is indicative of existence or non-existence of circuit continuity through said contacting or conducting parts.

3. A circuit-continuity testing device for electric circuits having a plurality of sections each of which contains a pair of normally contacting conductive parts which may be subject to formation of an insulating film which requires a potential difference for breakdown, comprising in combination a separate current source having a voltage of a fraction of a volt and less than said potential difference, a current-responsive instrument having an actuating circuit in operative relation to said separate source, and means for selectively applying said separate source to the sections of said circuits, whereby the response of said instrument is dependent upon contact condition of said conductive parts and is indicative of existence or non-existence of circuit continuity in any one of said sections.

4. Conductivity testing and improving device for a voltage-responsive supervisory or protective circuit in an electrical system normally operating at a predetermined maximum voltage, at least one section of which responsive circuit contains a pair of normally bodily contacting conductive parts included in a circuit adapted to be supplied by a normal current source comprising in combination a voltage responsive instrument connected in said responsive circuit, a separate conductivity-maintaining current source of a voltage which exceeds to such an extent the said predetermined maximum value as to be capable of puncturing an insufficiently conductive layer which may have formed between said parts, a switch having contacts for normally completing said voltage responsive circuit and contacts for intermittently connecting said conductivity maintaining current source to the portion of said circuit containing the bodily contacting parts, said contacts being alternatively in operation whereby conductivity-maintaining current impulses may be applied to said contacting conductive parts simultaneously with disconnecting the circuit from the voltage responsive device for protection thereof, and an auxiliary switching device for simultaneously disconnecting said switch from said voltage responsive circuit and connecting said conductivity maintaining separate current souce to the normally connected contacts of said first mentioned switch for puncturing any insufficient conductive layer which may have formed thereon and thus maintaining the conductivity thereof.

5. The method of testing and eventually improving the conditions of conductivity in an electric system normally operating at a voltage having a predetermined maximum value, containing at least one pair of normally bodily contacting conductive parts included in a circuit adapted to be supplied by a normal current source, which comprises the steps of intermittently connecting to said system an auxiliary current source of voltage capacity greater than said predetermined value for sending through said parts current impulses of predetermined maximum amperage, gradually raising the voltage so far above the predetermined maximum value as to be capable of puncturing an insufficiently conductive layer which may have formed between said contacting parts, and producing a response to such current impulses to indicate the improvement of such conductivity conditions.

6. The method of testing and eventually improving the conditions of conductivity in an electric system normally operating at a voltage having a predetermined maximum value and containing at least one pair of normally bodily contacting conductive parts subject to formation of an insulating film which requires a potential difference for breakdown, the parts being included in a circuit adapted to be supplied by a normal current source, which method comprises the steps of repeatedly connecting to said system an auxiliary current source of voltage greater than said predetermined value for sending through said parts current impulses of predetermined maximum amperage and a voltage which exceeds the said predetermined maximum value to such an extent as to be capable of puncturing an insufficiently conductive layer which may have formed between said contacting parts, after having first cut out a section of said system which shall remain unaffected by said impulses and producing a response to such current impulses to indicate improvement of such conductivity condition.

7. The method of testing and eventually improving the conditions of conductivity in an electric system normally operating at a voltage having a predetermined maximum value and having a plurality of sections, at least one of which contains a pair of normally bodily contacting conductive parts subject to variation in conductivity between said parts, said parts being included in a circuit adapted to be supplied by a normal current source, which method comprises the steps of repeatedly connecting to said system an auxiliary current source of voltage which exceeds the said predetermined maximum value to such an extent as to be capable of puncturing an insufficiently conductive layer which may have formed between said contacting parts for sending a current impulse through the system section containing said parts upon improvement of conductivity, while simultaneously barring to said impulse access to any desired other section of said system, such repeated connection being discontinued upon occurrence of such impulse indicating improvement of conductivity.

8. The method of testing and eventually improving the conditions of conductivity in an electric low-intensity system normally operating at a voltage having a predetermined maximum value, said system containing at least one pair of normally bodily contacting conductive parts included in a circuit adapted to be supplied by a normal current source, and having another section, which method comprises the steps of intermittently increasing the voltage applied to said parts above said maximum value, thereby puncturing an insufficiently conductive layer which may have formed between said contacting parts to produce a current impulse, simultaneously interrupting the circuit to said other section for forcing said current impulse into said first section, thereby preventing such increase of voltage from affecting said other section of said system, and producing a response to such current impulse to indicate improvement of such conductivity condition.

9. Conductivity testing and improving device for an electric system normally operating at a voltage having a predetermined maximum value, at least one section of which contains a pair of normally bodily contacting conductive parts, subject to variation in conductivity between said parts, said parts being included in a circuit adapted to be supplied by a normal current source, said device comprising in combination means for applying to said parts, from a separate current source, a voltage materially exceeding the said predetermined maximum value whereby, upon improvement of said conductivity, current impulses of increased magnitude flow through said parts, switching means for intermittently connecting said voltage applying means to the section of said system containing said parts, and a device having a connection to said current source responsive to such current impulses.

10. Conductivity testing and improving device for electric measuring circuits in electric systems normally operating at a predetermined maximum voltage, at least one section of which measuring circuits contains a pair of normally bodily contacting conductive parts included in a circuit adapted to be supplied by a normal current source, comprising in combination, a measuring instrument connected in said measuring circuit, a separate current source of a voltage which exceeds to such an extent the said predetermined maximum value as to be capable of puncturing an insufficiently conductive layer which may have formed between said parts, switching means for intermittently applying voltage from said separate current source to the section containing said parts and simultaneously disconnecting said measuring circuit from said measuring instrument, whereby a current impulse flows through said parts upon puncture of such insufficiently conductive layer and said measuring instrument is protected from damage which might be inflicted on the same by such current impulse, and a device responsive to such current impulse.

11. The method of testing and eventually improving the conditions of conductivity in an electric system normally operating at a voltage having a predetermined maximum value, containing at least one pair of normally bodily contacting conductive parts subject to variations in contact resistance, said parts being included in a circuit adapted to be supplied by a normal current source, which comprises the steps of intermittently connecting to said system parts, as often as may be necessary to produce an impulse of current therebetween, an auxiliary current source of voltage sufficiently greater than said predetermined maximum value as to be capable of puncturing an insufficiently conductive layer which may have formed between said contacting parts, and producing a response to such current impulse to indicate improvement of conductivity between said parts.

12. In combination a thermo-couple having first and second conductors terminating in a thermojunction, a voltage-responsive device having a pair of terminals, one of which is connected to said first thermocouple conductor, a third conductor connected to the other terminal, a fourth conductor connected to the first, a source of current having a voltage exceeding that generated by the thermo-couple, and switch means with first-, and second-position contacts for alternatively connecting said second and third conductors together by the first-position contacts, or connecting said source to said second and fourth conductors by the second-position contacts.

13. A system including the combination of claim 12 with a second switch for momentarily disconnecting said third conductor and connecting said source to said first-position switch-means contacts.

14. A system as in claim 13 wherein the first mentioned switch means includes also third-position contacts for connecting said source to the said disconnecting switch.

References Cited in the file of this patent
UNITED STATES PATENTS

| | | |
|---|---|---|
| 426,082 | Thomson | Apr. 22, 1890 |
| 1,708,982 | Vroom et al. | Apr. 6, 1929 |
| 1,750,699 | Austin | Mar. 18, 1930 |
| 1,785,818 | Peterson | Dec. 23, 1930 |
| 1,915,984 | Dowling | June 27, 1933 |
| 2,123,966 | Rees | July 19, 1938 |
| 2,183,838 | Hornickel | Dec. 19, 1939 |
| 2,215,910 | O'Hagan | Sept. 24, 1940 |
| 2,218,629 | Swart | Oct. 22, 1940 |
| 2,232,715 | Matthews | Feb. 25, 1941 |
| 2,310,335 | Wolfson | Feb. 9, 1943 |
| 2,411,522 | Chevigny | Nov. 26, 1946 |

---

UNITED STATES PATENT OFFICE

CERTIFICATE OF CORRECTION

Patent No. 2,701,965 February 15, 1955

Ralph Sherman, deceased; Alex Sherman and Arnold Sherman, executors

It is hereby certified that error appears in the printed specification of the above numbered patent requiring correction and that the said Letters Patent should read as corrected below.

Column 2, line 7, for "currents" read --current--; line 37, for "completed" read --complete--; column 7, line 1, for "the air" read --the aid-- column 10, line 78, for "have a" read --leave the--; column 11, line 61, for "wires 543" read --wires 453--.

Signed and sealed this 12th day of April 1955.

(SEAL)
Attest:

E. J. MURRY

Attesting Officer

ROBERT C. WATSON
Commissioner of Patents